(No Model.)
E. B. HITCHCOCK.
DENTAL MIRROR.
No. 528,163. Patented Oct. 30, 1894.
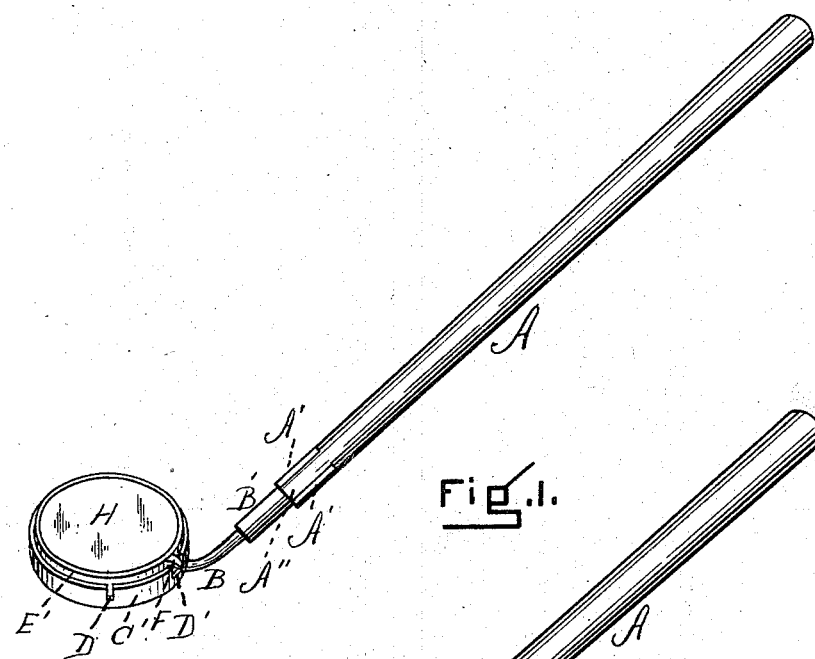
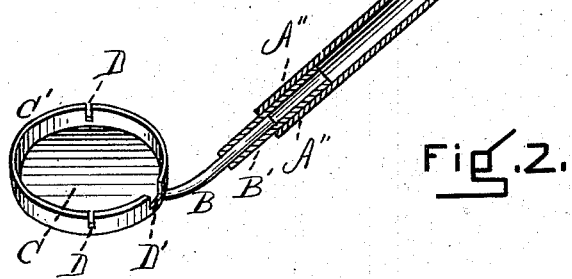
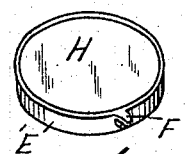
WITNESSES
J. M. Hartnett
L. B. Williams
INVENTOR
Edward B. Hitchcock,
By his Att'y
Henry W. Williams.

UNITED STATES PATENT OFFICE.

EDWARD B. HITCHCOCK, OF NEWTON, MASSACHUSETTS.

DENTAL MIRROR.

SPECIFICATION forming part of Letters Patent No. 528,163, dated October 30, 1894.

Application filed February 12, 1894. Serial No. 499,881. (No model.)

*To all whom it may concern:*

Be it known that I, EDWARD B. HITCHCOCK, a citizen of the United States, residing at Newton, in the county of Middlesex and State of Massachusetts, have invented new and useful Improvements in Mirrors for Dental and Surgical Purposes, of which the following is a specification.

This is a mirror intended for use in dental and surgical operations, particularly the former, and it has for its principal object, to prevent the spread of disease or infection by reason of the same instrument being used in connection with different patients. In order to accomplish this result, a rigid handle is provided, made tubular at its lower end, and having such end longitudinally slitted in order to receive and retain an intermediate piece made of a metal which can be easily bent into different angles, the lower end of said intermediate piece having rigidly secured to it a cup whose annular rim is slitted in order to receive and hold a mirror consisting of a frame and glass, adapted to be readily removed and thrown away if desired, after use, or thoroughly cleansed and returned to the cup, which, as well as the mirror, can, after the latter has been detached, be easily immersed in an antiseptic solution or boiling water.

In the accompanying drawings, in which similar letters of reference indicate corresponding parts,—Figure 1 is a perspective view of a dental or surgical mirror embodying my invention. Fig. 2 is a similar view, a part however being shown in longitudinal section, with the mirror proper removed from its position in the cup. Fig. 3 is a view of the mirror proper removed. Fig. 4 is a vertical section of the same.

A represents a rigid handle made preferably of metal and tubular at its lower end or throughout its entire length, as desired. The lower end of this handle is provided with longitudinal slits A' which extend up for a short distance, and the spring of the parts A'', between the slits, serves to hold securely in position the shank B' (preferably tubular) of the intermediate piece or holder B, whose upper end is rigidly secured within said tubular shank B'. This holder B is made of metal sufficiently soft or non-rigid to be bendable by the operator, in order to adapt the angle of the mirror to the position or location of the part to be operated upon. The lower end of the holder B has rigidly secured to it a cup whose bottom C is substantially flat and preferably round, and whose sides are bent at substantially right angles to the bottom so as to form an annular rim C'. This rim is provided with a number of vertical slits D, and with a broad recess D'.

The mirror consists of a round, cup-shaped frame, consisting of a substantially flat bottom E and annular rim E', said rim being preferably a little flaring, and provided with a handle or projection F. Within this cup-shaped frame E E', the reflecting glass H is cemented or otherwise permanently secured.

When the parts are in position ready for use, as shown in Fig. 1, the lower end of the handle A springs snugly around the shank B', and the annular rim C' springs tightly around and against the rim E' of the mirror cup or frame, holding it snugly by reason of the slight yielding of the rim C', made possible by the existence of the slits D. When the parts are in position, the projection F upon the mirror lies in the notch D' in the rim of the cup, said notch being for the purpose of enabling the mirror to be easily slipped out of the cup and removed.

It is apparent that the mirror, consisting as it does of the cup-shaped frame E E' and the glass H, can be very cheaply manufactured, so cheaply, in fact, that the dentist or surgeon can well afford to remove and throw away the mirrow after using it in connection with a patient. The cup C C' is then easily cleansed by washing it in a suitable solution, and all possible danger of transmitting disease from one patient to another is done away with; but should the operator not choose to throw away the mirror, both it and the cup C C' can be easily and thoroughly cleansed after they have been separated.

It will readily be seen that a little bending of the rim C' or the parts A'' would be sufficient to overcome and correct any looseness of fit as regards the mirror or the shank B'.

It is apparent that the connection between the cup and handle cannot only be bent, but can be moved in the handle both rotatively and longitudinally, and hence the adaptability of the instrument to different locations is increased.

Having thus fully described my invention, what I claim, and desire to secure by Letters Patent, is—

1. In a mirror for dental or surgical purposes, a cup consisting of the bottom C and rim C' provided with the slits D, and a mirror proper comprising a cup or frame consisting of the bottom E and the rim E' and the glass H secured within said frame, substantially as set forth.

2. In a mirror for dental or surgical purposes, the cup consisting of the bottom C and rim C' the latter being provided with the slits D and notch D', and the mirror proper consisting of the cup E E' provided with the handle or projection F and the glass H secured within said cup, said handle F being adapted to extend through said recess D', substantially as described.

EDWARD B. HITCHCOCK.

Witnesses:
HENRY W. WILLIAMS,
E. A. WOODBURY.